Dec. 13, 1938.　　　　G. A. PARK　　　　2,139,909
LOCKED COMPARTMENT
Filed Jan. 20, 1938
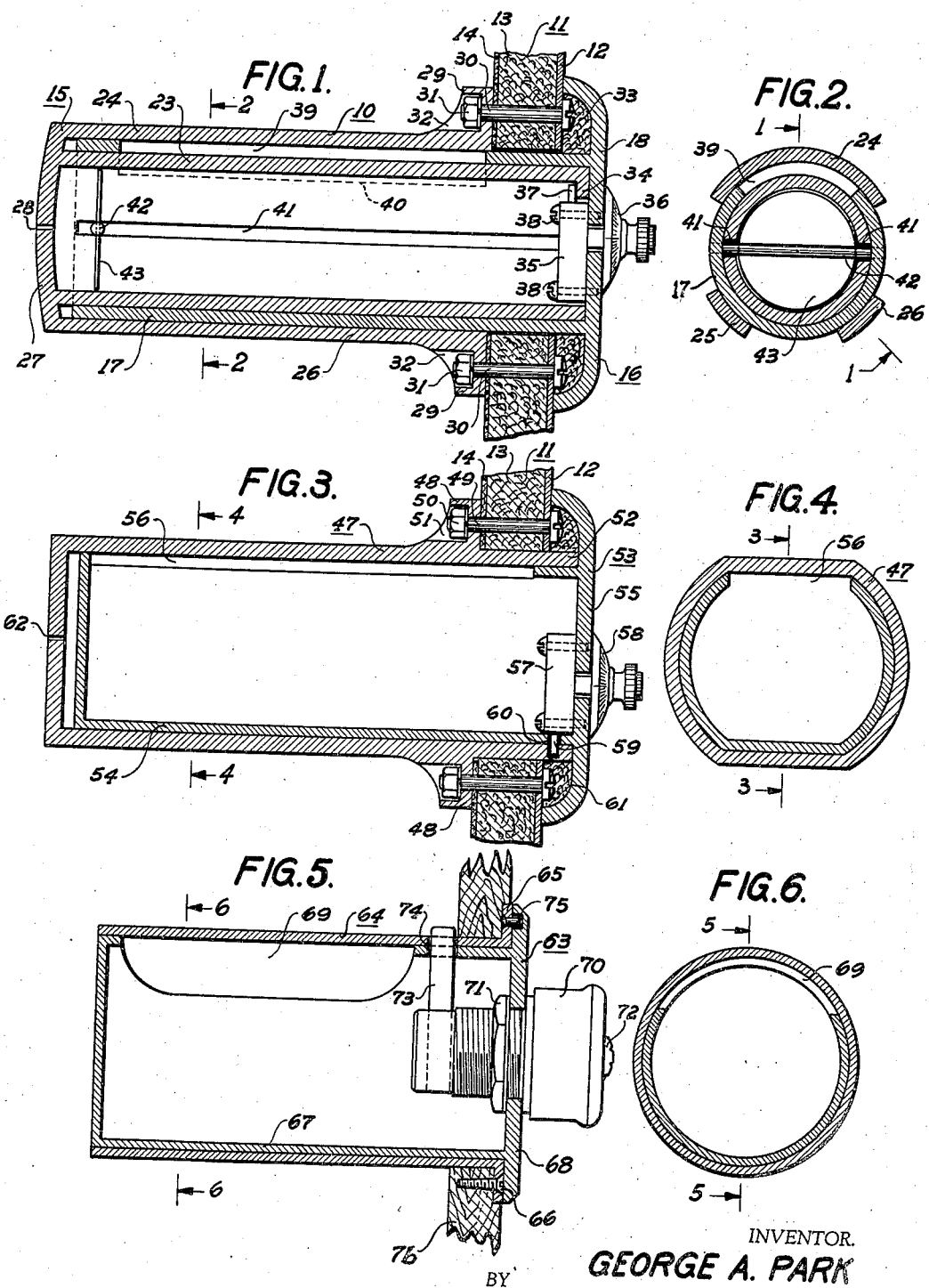
INVENTOR.
GEORGE A. PARK
BY Woodling and Krost
ATTORNEY.

Patented Dec. 13, 1938

2,139,909

UNITED STATES PATENT OFFICE 2,139,909

LOCKED COMPARTMENT

George A. Park, Lakewood, Ohio

Application January 20, 1938, Serial No. 185,868

5 Claims. (Cl. 40—19)

My invention relates to locked compartments and more particularly to locked compartments for keeping a spare key or valuable papers which may be opened, for example, from the outside of a motor vehicle or a dwelling.

It is not uncommon for a person to lock himself or herself out of a modern automobile by inadvertently closing the door when the key is left inside of the car. The accidental locking of one's car by leaving the key inside of the car may happen at the moment when the person is making an urgent call and when it is very essential that no time be lost by resorting to means to open the door. Such inadvertence usually entails a great deal of worry and may waste a considerable amount of time and money. If a person is skillful, he may lift the hood and by means of a bent piece of wire or other material fish it through the clutch pedal slot in the floor board and hook an improvised twisted ring on the end of the wire over the side door handle and unlatch the door. The art of unlocking the door in this fashion is usually beyond that possessed by the ordinary person because the wire must be twisted over the handle in such fashion as to prevent the wiring slipping off when pulling the handle down as the door is concurrently pulled open. With the modern cars which have only the top part of the hood raisable, it is substantially impossible for a person to crawl down and insert a wire through the clutch pedal opening as was possible with the earlier cars having the hood raisable from either side. On the modern cars having the top part of the hood raisable, substantially the only possible way to unlock the car, is to have the car jacked up and towed, which is quite expensive, to a service station and have new keys made, unless the owner should have an extra set of keys at home in which case it may be more convenient to go home and obtain the keys. When the car is towed into a service station and new keys are made, they may be imperfect and may damage the lock of the door so that the regular set of keys may thereafter stick or not work properly after the car is once opened.

With my invention an extra set of keys may be carried in my locked compartment to which access may be obtained by raising the hood and operating a combination lock to open the drawer of my locked compartment. Besides keeping an extra set of keys in my locked compartment, the registered factory key number may also be carried in the locked compartment, so that new keys may be obtained by sending to the factory. Furthermore the driver's license or other valuable papers may be kept in the locked compartment ready for access in case of need, which assures full confidence and freedom from worry.

An object of my invention is the provision of a locked compartment for a motor vehicle in which a spare key or valuable paper such as driver's license may be deposited and to which access may be gained by operating a combination lock mechanism accessible from the outside of the motor vehicle.

Another object of my invention is the provision of mounting a locked compartment to the partition between the seat compartment and the engine compartment of a motor vehicle, so that access may be had to the locked compartment by raising the hood of the motor vehicle and operating a combination lock mechanism.

Another object of my invention is to provide for concealing the securing means which hold the locked compartment to the partition between the seat compartment and the engine compartment of the motor vehicle to prevent disengagement of the securing means when the drawer of the locked compartment is closed.

Another object of my invention is the provision of a locked compartment which may employ a suitable and conventional combination lock mechanism, so that access may be gained to the locked compartment without the use of a key.

Another object of my invention is the provision of a locked compartment which is of simple construction and which may withstand abuse against injury due to an attempt to demolish the locked compartment to gain access to the inside thereof.

Other objects and a fuller understanding of my invention may be had by referring to the following description and claims, taken in conjunction with the accompanying drawing, in which:

Figure 1 represents a longitudinal and vertical cross-sectional view of a locked compartment embodying the features of my invention; the section being taken along the lines 1—1 of Figure 2;

Figure 2 is a cross-sectional view of my locked compartment shown in Figure 1, taken along the line 2—2 thereof;

Figure 3 is a longitudinal and vertical cross-sectional view of a modified form of a locked compartment embodying my invention, the section being taken along the line 3—3 of Figure 4;

Figure 4 is a cross-sectional view taken along the line 4—4 of Figure 3;

Figure 5 is a longitudinal and vertical cross-sectional view of a further modified form of my invention, the section being taken along the line 5—5 of Figure 6; and Figure 6 is a cross-sectional view of the locked compartment of Figure 5, taken along the line 6—6 thereof.

With reference to Figures 1 and 2 of the drawing, the embodiment of my locked compartment is indicated generally by the reference character 10 which may be mounted to a partition 11 located between the seat compartment and the engine compartment of a motor vehicle. Upon the modern cars, the partition may comprise a sheet of steel 12 against which is applied a relatively thick pad of felt 13 covered with a sheet of composition 14 positioned on the driver's side of the partition. The pad of felt 13 and the sheet of composition 14 are arranged to minimize the heat transfer from the engine to the seat compartment.

As illustrated, my lock compartment 10 comprises two main parts; namely, a stationary part indicated by the reference character 15 and a slidable part indicated by the reference character 16. The slidable part comprises a front cover 18 and a drawer 17 arranged to be slidably mounted upon the stationary part 15. The stationary part comprises an internal support 23 which may be round as illustrated or any other suitable shape and external concentric supports 24, 25 and 26. The internal support 23 passes through the partition 11 with a forward and rearward portion extending from either side of the partition. The internal support 23 and the external supports 24, 25 and 26 are joined at their rear by means of the rear wall 27, and the external supports 24, 25 and 26 extend forwardly for engagement with the partition 11. The portion of the external supports 24, 25 and 26 engaging the rear side of the partition 11 are provided respectively with lugs 29 having recesses 32 provided therein. The lugs 29 may be securely fastened to the partition 11 by means of nuts 31 fitting closely in the recesses 32 and threaded screw bolts 30 extending through the partition 11 and threadably engaging the nuts 31. The nuts 31 are arranged to fit closely in the recesses 32, so that there is not sufficient room to turn them by means of a tool or wrench fitting in the recesses 32. The front cover 18 is arranged to extend laterally and cover the heads of the screw bolts 30, so that the heads of the screw bolts 30 are concealed to prevent disengagement of the locked compartment when the drawer is closed. A pad of felt 33 or other sound deadening material may be positioned behind the cover 18, so that when the drawer is closed, the pad of felt 33 is slightly compressed which keeps the drawer 17 from chattering or vibrating.

The external supports 24, 25 and 26 are spaced from the internal support 23 to provide room for the drawer 17 to slidably move therebetween. The top of the drawer 17 is provided with an opening 39 and the sides of the opening may be indicated by the reference character 40. The forward or right-hand end of the internal support 23, along the upper edge thereof, may be provided with a lock engagement portion 34 which is arranged to be engaged by a latch 37 of a combination lock mechanism 35 mounted upon the front cover 18. Any suitable manner may be employed to mount the combination lock mechanism to the cover 15 and as illustrated, I employ the screw 38. The dial 36 of the combination lock mechanism may be of any conventional type and is arranged to be manipulated back and forth in a definite sequence to unlatch the latch 37 from engagement with the lock engagement portion 34 to permit the drawer 17 to be withdrawn.

Positioned transversely of the internal support 23 is a plate 43 which is slidably movable within the internal support 23 and which is suitably fastened to a cross-pin 42 having its ends mounted on the opposite side of the drawer 17. Thus, when the drawer 17 is pulled out, the transverse plate 43 may engage a deposited article such, for example, as a key, and drag it to the forward end of the internal support 23 where it may be removed from the compartment through the opening 39 in the top of the drawer 17. The opposite sides of the internal support 23 are slotted longitudinally as indicated by the reference character 41 and permit the cross-pin 42 carrying the transverse plate 43 to be movable longitudinally with the movement of the drawer 17. The cross-pin 42 fitting into the longitudinal slots 41 in addition restrains the drawer 17 from turning within the internal support 23 and causes the latch 37 to register with the lock engagement portion 34. A vent 28 is provided in the rear wall 27 so that air may escape as the drawer is moved inwardly.

In Figure 3, I show a modified form of my locked compartment which comprises two main parts; namely, a stationary housing 47 and a slidable part 53. The shape of the compartment in Figure 3 may be of any suitable proportions, for example, as that shown in cross-section Figure 4, and it may be mounted to the partition 11 by means of screw bolts 49 and nuts 50 which closely fit in recesses 51 of the lugs 48. The forward end 52 of the stationary housing 47 passes through the partition 11 and extends forwardly thereof to engage the rear side of a front cover 55 integrally connected to a drawer 54 having a top opening 56 for gaining access to the locked compartment. A combination lock mechanism 57 is mounted on the front cover 55 by means of the suitable illustrated screws and is arranged to have a latch 59 which moves in and out of the registered openings 60 provided in the drawer 54 and the wall of the stationary housing 47. A suitable dial 58 may be provided for the combination lock mechanism and may be moved back and forth in a definite sequence to withdraw the latch 59 from the registered opening 60, after which the drawer 57 may be opened. In order to prevent dismantling of the locked compartment from the partition 11, I provide for laterally extending the cover 55 so that it conceals the heads of the screw bolts 49 when the drawer 54 is closed. A felt packing 61 may be provided in the rear of the front cover 55, so that when the drawer 54 is in its locked position, the felt packing 61 is slightly compressed to keep the drawer from chattering. A vent hole 62 is provided in the rear wall of the stationary housing 47 to allow air to escape as the drawer is pushed inwardly.

The front face of the covers 18 and 55 may be made of steel and designed in a decorative fashion to give a pleasing appearance, and the locking mechanism may be designed to give a substantially infinite number of combinations, to prevent thievery which may be practiced by expert lock pickers.

In Figure 5, I show another modified form of my invention which may be provided with a different type of combination lock mechanism and may be of valuable use in homes as well as for use with automobiles. For home installation, my locked compartment may be mounted on an outside door which is illustrated in Figure 5 by the reference character 76. This form of my invention comprises the slidable part 63 and a stationary housing 64 mounted to the door or other fastening member 76. The right-hand or forward end of the stationary housing 64 may be provided with lateral flanges 65 and mortised in the front face of the door 76 and mounted thereto by means of the screws 66. The slidable part 65 comprises a slidable drawer 67 having an opening 69 and a front cover 68 which extends laterally and radially to seal the screw 66, to prevent the disengagement of the locked compartment when the drawer 67 is closed. The combination lock mechanism is indicated by the reference character 70 and may be of a different kind than that employed in the Figures 1 and 3 and may be securely mounted to the front cover 68 by means of the jamb nut 71. To unlock the combination lock mechanism 70, the rotary notched wheels 72 of which there may be three or more in number are rotated to their proper position, after which the knob may be turned to actuate the lock pin 73 from engagement with the registered openings 74 of the drawer and the side wall of the stationary housing 64. In this embodiment of my invention, I employ a centering pin 75 fitting into a registering depressed portion of the cover to insure that the drawer 67 is turned to its correct position to make the lock pin 75 register with the opening 74.

In all the forms of my invention, the combinations of the lock mechanism may be registered with a local auto club or other bureau so that in the event the numbers of combinations are forgotten, they may be obtained by calling the auto club or other bureau. Because of the convenience of my invention, it eliminates a great deal of worry and saves a lot of time and money which may be otherwise wasted.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A locked compartment arranged to be mounted to a partition comprising, in combination, an internal support passing through the partition with a forward and rearward portion extending from each side thereof, a slidable drawer extending through the partition from the front side thereof and being externally mounted upon the internal support, said drawer having an opening in its top, external support means engaging the rearward end of the internal support and extending forwardly for engagement with the rearward side of the partition, the forwardly extending portion of the external support means being spaced from the internal support to provide room for the drawer, means extending through the partition for securing the external support means thereto, said drawer having a front cover for concealing the portion of the securing means appearing upon the front side of the partition to prevent disengagement of the securing means when the drawer is closed, a lock engagement portion provided upon the forward end of the internal support, a combination lock mechanism provided on the front cover and arranged to have a latch portion to engage the lock engagement portion for locking the drawer to the internal support, a transverse member positioned laterally of the internal support and longitudinally movable therein, and means for connecting the transverse member to the drawer, so that as the drawer is pulled out the transverse member may engage a deposited article and drag it to the forward end of the internal support, where it may be removed from the compartment through the opening in the top of the drawer.

2. A safe compartment comprising, in combination, a sliding drawer, an internal housing adapted to fit within said drawer, an outer housing connected with said internal housing and adapted to fit outside of said drawer, locking means to co-act between said drawer and said inner housing, a transverse member secured to said drawer and arranged to withdraw forwardly the contents of said internal housing as said drawer is withdrawn.

3. A safe compartment arranged to be mounted on a partition comprising, in combination, a drawer, an internal support adapted to fit within said drawer, an external support, fastening members through said external support to secure said safe compartment to said partition, a lock mounted on said drawer for co-acting with said internal support to lock said drawer to said internal support, a transverse member actuated by said drawer and arranged to withdraw forwardly the contents of the internal support as the said drawer is withdrawn.

4. A safe compartment arranged to be mounted on a partition comprising, in combination, a drawer having an opening, a housing adapted to fit within said drawer, a locking device mounted on said drawer to engage said housing, a transverse member arranged to withdraw forwardly the contents of the compartment as said drawer is withdrawn, a plurality of external supports, one of which is arranged to cover the opening in said drawer when the drawer is in its locked position, fastening means arranged through said external supports to secure said safe compartment to said partition.

5. A locked compartment arranged to be secured to a partition comprising, in combination, an internal support means extending through the partition, said internal support having a rearward closing portion, external support means attached at its rearward end to the rearward portion of the said internal support, fastening means on said external support to secure said locked compartment to said partition, a slidable drawer arranged to be supported between the said external and internal support means, a face plate attached to said drawer and arranged to conceal said fastening means, locking means through said face plate arranged to secure said face plate to said internal support, a transverse member actuated by said slidable drawer and arranged to withdraw forwardly the contents of said internal support as the said drawer is withdrawn.

GEORGE A. PARK.